(12) United States Patent
Wolf et al.

(10) Patent No.: US 8,128,149 B1
(45) Date of Patent: Mar. 6, 2012

(54) SYSTEM FOR SECURING A TRUCK BED COVER

(76) Inventors: Mark A. Wolf, Surprise, AZ (US); Robert A. Wolf, Scottsdale, AZ (US)

( * ) Notice: Subject to any disclaimer, the term of this patent is extended or adjusted under 35 U.S.C. 154(b) by 43 days.

(21) Appl. No.: 12/872,924

(22) Filed: Aug. 31, 2010

(51) Int. Cl.
*B60P 7/02* (2006.01)
(52) U.S. Cl. ............... 296/100.16; 296/100.17; 160/371
(58) Field of Classification Search ........... 296/100.15–100.18; 160/371
See application file for complete search history.

(56) References Cited

U.S. PATENT DOCUMENTS

| | | | | |
|---|---|---|---|---|
| 3,727,972 A | * | 4/1973 | Belk | 135/119 |
| 4,607,876 A | * | 8/1986 | Reed | 296/100.18 |
| 4,848,824 A | * | 7/1989 | Smith et al. | 296/100.18 |
| 5,165,750 A | * | 11/1992 | Pirhonen | 296/100.18 |
| 5,988,472 A | * | 11/1999 | McPhail et al. | 224/403 |
| 6,322,129 B2 | * | 11/2001 | Huotari | 296/100.15 |
| 6,893,072 B1 | * | 5/2005 | Graves | 296/100.12 |
| 6,893,073 B2 | * | 5/2005 | Wheatley | 296/100.15 |
| RE41,078 E | * | 1/2010 | Schmeichel | 296/100.15 |
| 7,954,876 B2 | * | 6/2011 | Kosinski | 296/98 |
| 2010/0133872 A1 | * | 6/2010 | Kosinski | 296/100.09 |

* cited by examiner

*Primary Examiner* — Lori Lyjak
(74) *Attorney, Agent, or Firm* — Morgan Law Offices, PLC

(57) ABSTRACT

A system for securing a truck bed cover includes a pair of vertical side rails clamped to the bed railing of a pickup truck. A first one of a pair of horizontal side rails is attached along the front side of the truck bed and the second one of the pair of horizontal side rails is attachable via a latching mechanism along the rear. The cover is attached along respective front and rear edges to each of the horizontal side rails, and is attachable along respective side edges to the vertical side rails, preferably, using a hook-and-loop fastener. Tensioning devices are employed to keep the cover taut and even on both sides.

13 Claims, 8 Drawing Sheets

SYSTEM FOR SECURING A TRUCK BED COVER

FIELD OF THE INVENTION

The present invention relates to the field of motor vehicle accessories, and, more particularly to a system for securing a truck bed cover to a vehicle such that the cover remains taut.

BACKGROUND

In recent years, larger vehicles such as pickup trucks have become increasingly popular. With the increased popularity of pickups, a substantial aftermarket for truck bed covers has emerged. While many types of covers exist, one of the most popular has been the soft Tonneau cover that can be rolled over a truck bed. Benefits include protection from the elements, theft protection, and securing articles in the cargo area that could become damaged or blown away when the vehicle is driven. Additionally, studies have shown that placement of a Tonneau cover on a pickup reduces coefficient of drag significantly, thereby increasing fuel efficiency.

In general, such soft Tonneau covers are made from a substantially flat, flexible weather-resistant material such as vinyl. However, one practical difficulty has been that such covers can become loose or wrinkled over time or as a consequence of being exposed to the elements. To deal with this problem, various solutions have been offered. For example, U.S. Pat. No. 7,445,264 to Spencer et al. discloses a pair of tension control devices disposed on the front of the cover area that each include a spring plunger. These tension control devices work by constantly pulling the cover forward (and the tension can be manually adjusted by turning a screw on each device). However, these tension control devices are relatively complex and costly to manufacture. Moreover, it may be difficult to ensure that the tension control devices are in sync after manual adjustment, and if they are not, the cover can be pulled to one side, causing wrinkling and possible damage.

SUMMARY OF THE INVENTION

A system for securing a truck bed cover includes a pair of vertical side rails clamped to the bed railing of a pickup truck. A first one of a pair of horizontal side rails is attached along the front side of the truck bed and the second one of the pair of horizontal side rails is attachable via a latching mechanism along the rear. The cover is attached along respective front and rear edges to each of the horizontal side rails, and is attachable along respective side edges to the vertical side rails, preferably, using a hook-and-loop fastener. Tensioning devices are employed to keep the cover taut and even on both sides.

Preferably, each of the tensioning devices includes a fastener extending from an end of the front horizontal side rail; a plurality of pin holes and a larger, longitudinally elongated hole formed on an end of a vertical side rail; and, between the front horizontal side rail and the end portion of the vertical side rail, a plate having a hole and a pin on a bottom surface thereof. From the front horizontal side rail, the fastener passes through the hole in the plate and the longitudinally elongated hole, secured on an opposing side. The pin is fitted into a selected one of the plurality of pin holes.

Preferably, the latching mechanism includes a spring-loaded catch that automatically secures the latch when it is closed. The latch may be opened by manually pulling a release lever so that the catch releases the latching mechanism.

These and other aspects, features, and advantages of the present invention will become apparent from the following detailed description of preferred embodiments, which is to be read in connection with the accompanying drawings.

DETAILED DESCRIPTION

Throughout the following description of the invention the modifiers "front", "rear", and "side" (and "sides") are employed. It is to be understood that "front" as used herein refers to an area toward the front of the vehicle (where the driver is seated when the car is driven), "rear" as used herein refers to an area toward the rear of the vehicle (where the tailgate is situated), and the sides as used herein refer to the areas along the driver's side of the vehicle and the passenger side of the vehicle. Thus, it is to be understood that these words are used according to their ordinary and usual meanings.

Figure 1:
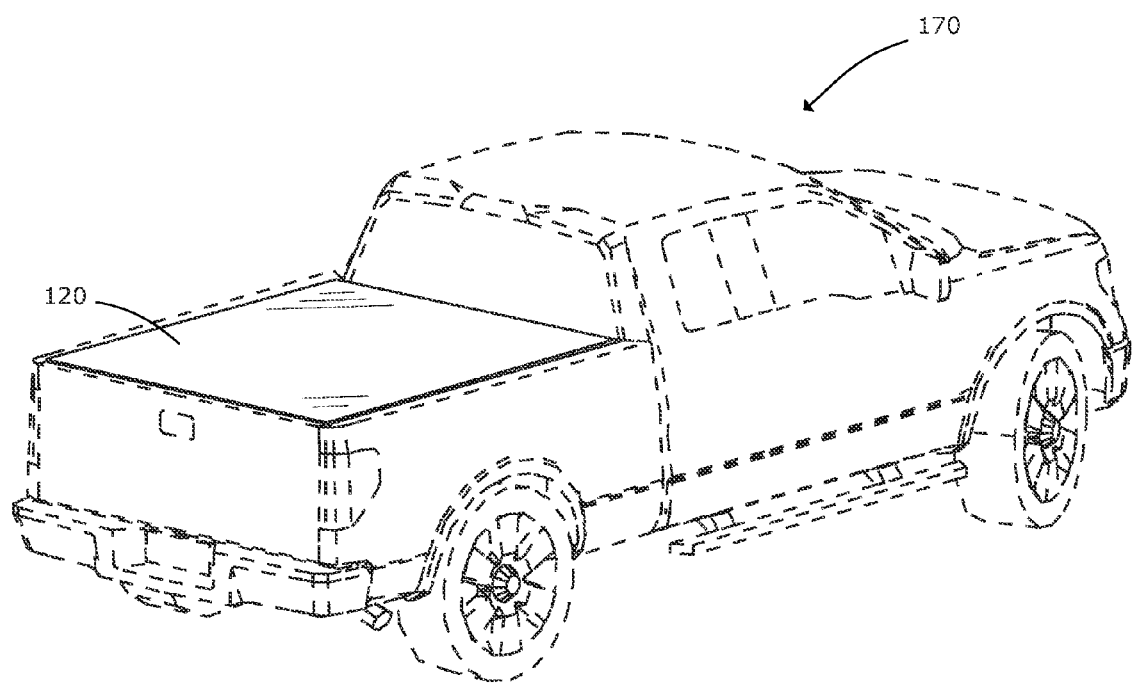
FIG. 1 shows an exemplary truck bed cover installed on a pickup truck.

FIG. 1 illustrates an exemplary truck bed cover 120 installed on a pickup truck 170. As will be described in greater detail, the truck bed cover 120 is, preferably, a soft Tonneau cover that can be rolled over the bed of the pickup truck 170. Preferably, the truck bed cover 120 maintains a low profile, and is constructed of a substantially flat, flexible weather-resistant material, such as vinyl.

Figure 2:
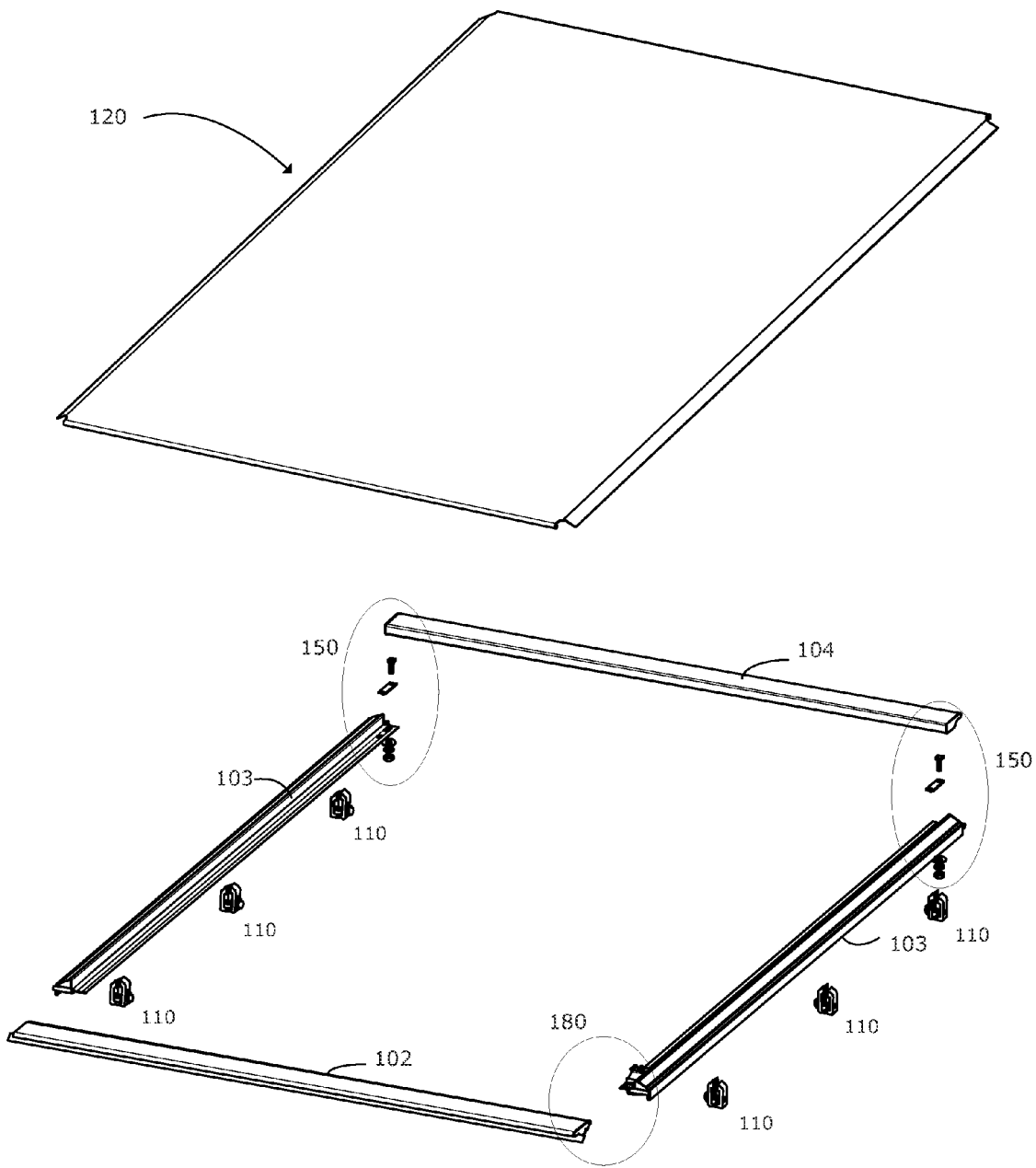
FIG. 2 shows an exploded view of the exemplary truck bed cover with framing support and exemplary tension control and latching devices.

FIG. 2 shows an exploded view of the exemplary truck bed cover 120 with framing support. Also shown are exemplary tension control devices 150 and latching device 180. For illustrative purposes, the framing is shown separated into its component parts. The framing itself includes a pair of substantially identical vertical side rails 130 and a pair of horizontal side rails 102, 104. When installed, the first one of the pair of vertical side rails 103 is attached along a driver side and the second one of the pair of vertical side rails 103 is attached along a passenger side. Most preferably, and as is known in the art, the vertical side rails 103 can be clamped to bed railing of the pickup truck 170, using a plurality of clamps 110. The first one of the pair of horizontal side rails 104 is attached along the front side of the truck bed, preferably, by bolting the first one of the pair of horizontal side rails 104 to front corners where the first one of the pair of horizontal side rails 104 and respective vertical side rails 103 meet.

Preferably, the first one of the horizontal side rails 104 is attached to a front edge of the truck bed cover 120, and the second one of the pair of horizontal side rails 102 is attached to a rear edge of the truck bed cover 120. Preferably, the second one of the pair of horizontal side rails 102 is attachable to respective rear corners of the vertical side rails 103 using the latching device 180, as will be described in further detail. Preferably, the side edges of the truck bed cover 120 are attachable (and detachable) to respective vertical side rails 104 using a hook-and-loop fastener. Most preferably, each of the vertical side rails 103 includes a strip of "hooks" bonded thereon, and a strip of loops" is sewn on (or otherwise fastened to) each of the side edges of the truck bed cover 120. Preferably, and as is known in the art, the vertical side rails 103 can include a sloped area, wherein the aforementioned strip of hooks is bonded thereto.

Figure 3A:
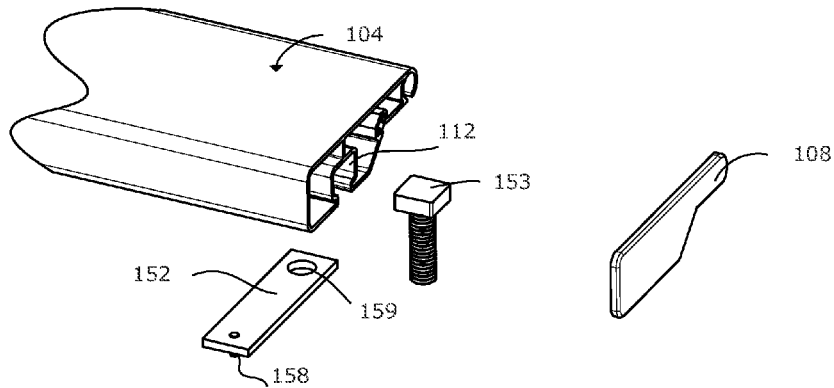
FIGS. 3(a) and 3(b) show exploded views of an exemplary tension control device.
Figure 3B:
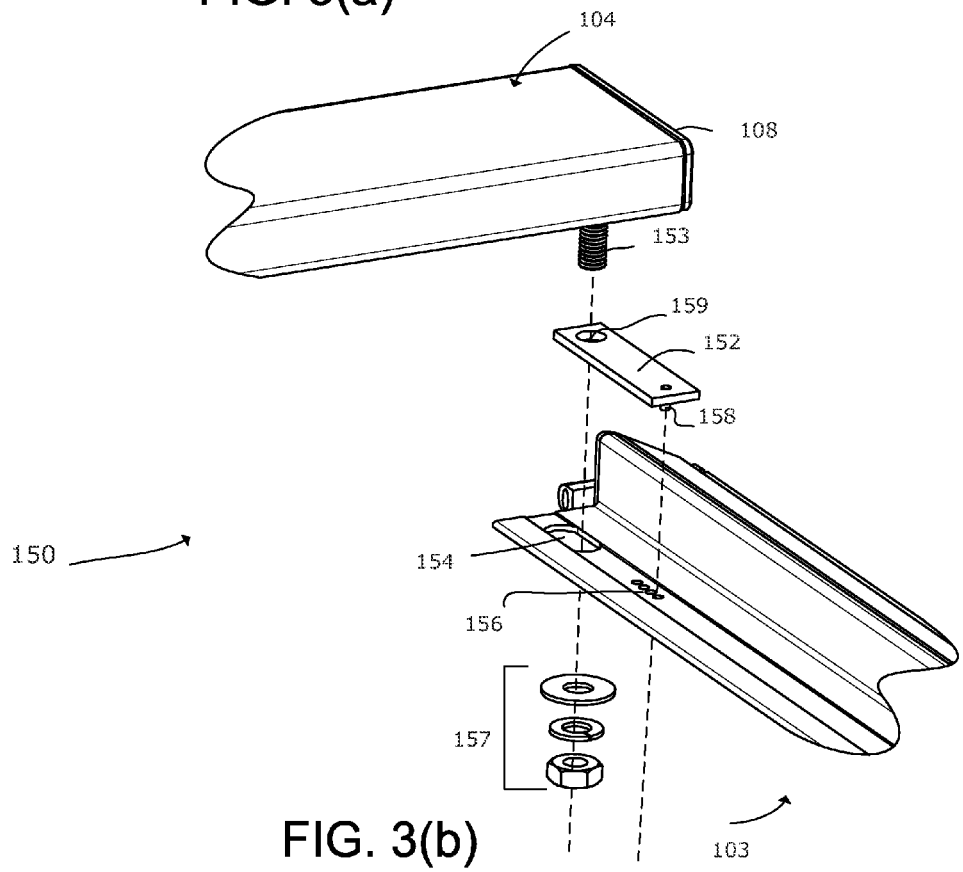

FIGS. 3(a) and 3(b) show exploded views of an exemplary tension control device 150. It is to be understood that this tension control device 150 is one of a pair of substantially identical tension control devices 150 situated on front opposite corners. Thus, discussion will be limited to only one of the pair, as it applies to the other one as well.

As depicted in FIG. 3(a), an end portion of the first one of the horizontal side rails 104 includes a receiving slot 112 for receiving a bolt 153, the end portion of the first one of the side rails 104 secured by an end cap 108. As illustrated in FIG. 3(b), on an end of a vertical side rail 103, the vertical side rail 103 attached substantially perpendicularly to the first one of the horizontal side rails 104, a plurality of pin holes 156 and a larger, longitudinally elongated hole 154 are formed therein. Between the first one of the horizontal side rails 104 and the end portion of the vertical side rail 103, is a plate 152 having a hole 159, and a pin 158 on a bottom surface thereof. When installed, the bolt 153 extends from the first one of the horizontal side rails 104, passing through the hole 159 in the plate 152 and the longitudinally elongated hole 154 in the end portion of the vertical side rail 103, secured on an opposing side of the end portion of the vertical side rail 103 by a washers/nut 157 combination, as shown; and the pin 158 is fitted into a selected one of the plurality of pin holes 156.

Figure 4:
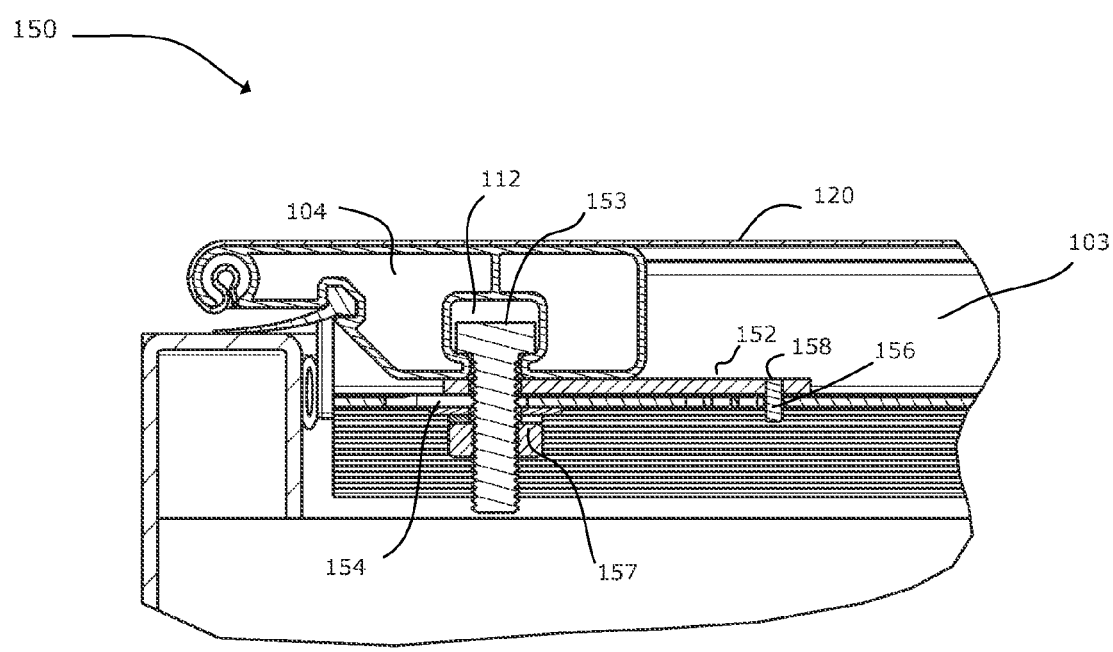
FIG. 4 shows a cutaway view of the tension control device.
Figure 5A:
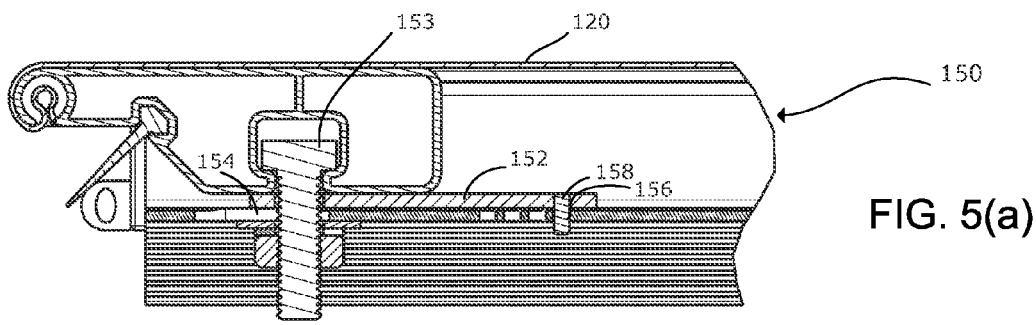
FIGS. 5(a) through 5(d) show cutaway views of the tension control device at different settings.
Figure 5B:
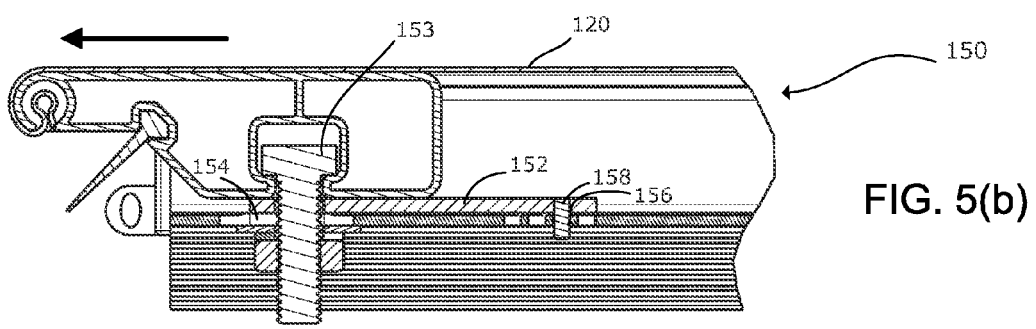
Figure 5C:
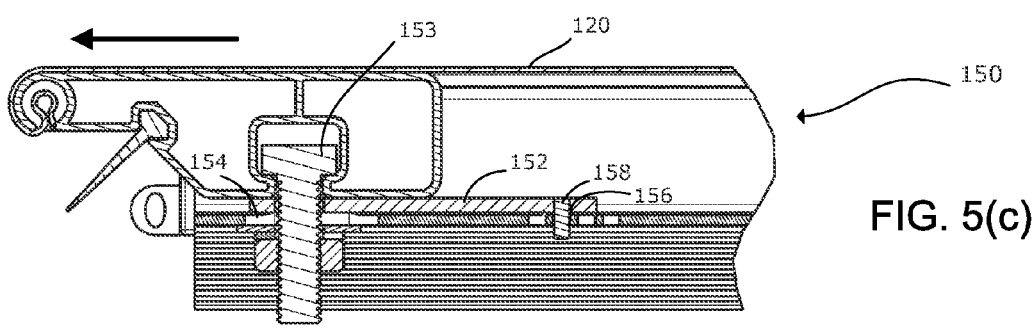
Figure 5D:
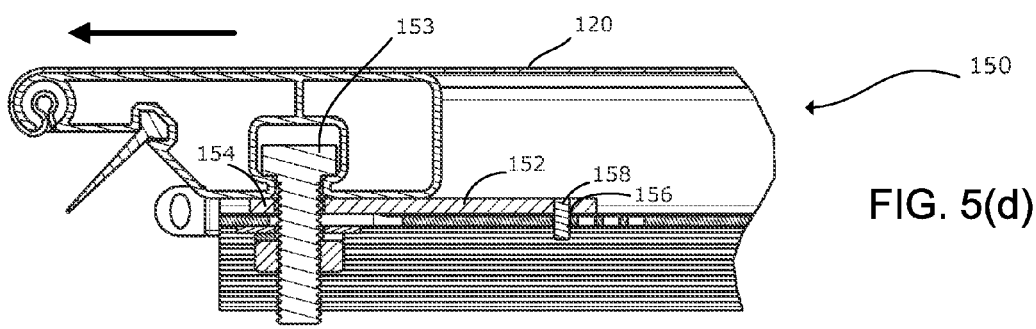

FIG. 4 shows a cutaway view of the exemplary tension control device 150.

FIGS. 5(a) through 5(d) show cutaway views of the tension control device 150 at different settings. As shown, there are four available pin holes 156, and depending on the pin hole 156 selected, the first one of the horizontal side rails 104 (and along with it the truck bed cover 120) will be moved toward the front of the vehicle by a certain distance. Thus, the user can adjust the tension by selecting an appropriate pin hole, and then bolting the mechanism in place at that particular position. Advantageously, the longitudinally elongated hole 154 allows the bolt 153 to be easily positioned appropriately.

Figure 6:
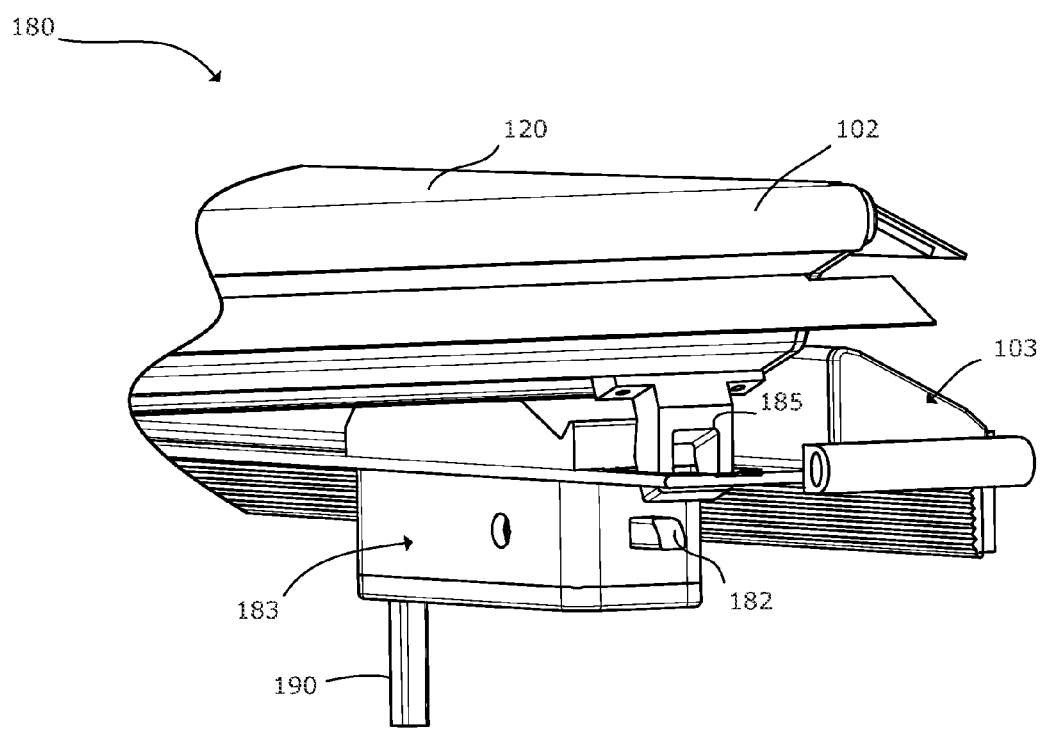
FIG. 6 shows an exemplary latching device.
Figure 7:
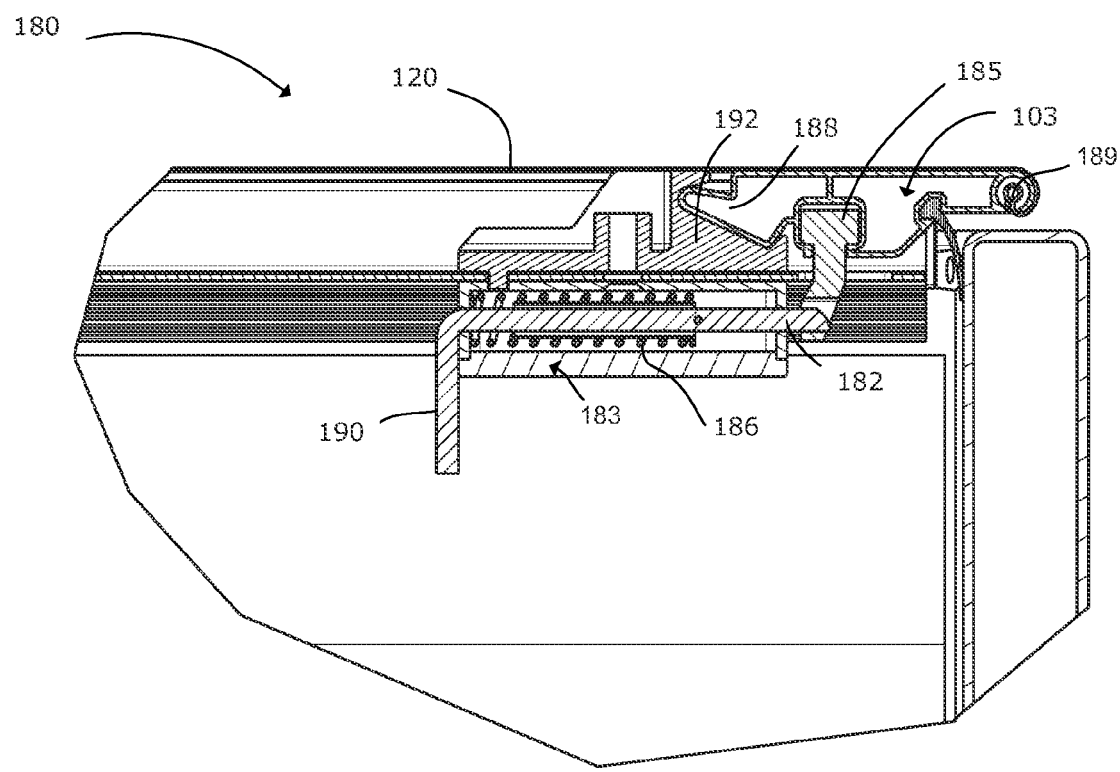
FIG. 7 shows a cutaway view of the exemplary latching device.

FIG. 6 shows the exemplary latching device 180. Preferably, the latching device 180 is situated at a rear end corner of a vertical side rail 103, most preferably, the passenger-side rear end corner (as shown in FIG. 2). The latching assembly 183 is, preferably, bolted or welded to the vertical side rail 103. As will be described in greater detail, the latching assembly 183 includes a spring-loaded catch 182 engageable with a slotted extrusion 185 that is attached to the second one of the horizontal side rails 102. Referring to FIG. 7, which shows a cutaway view of the exemplary latching device 180, the latching device 180 is shown in a closed position. As illustrated, the latching assembly 183 includes the spring-loaded catch 182 using a spring 186 to exert force for moving the catch through the slotted extrusion 185, and keeping it in that position (until it is manually released). Additionally, the latching device 180 includes a latch 188 hingeably attached (using hinge 189) to the second one of the horizontal side rails 102, as shown. When the latching device 180 is in the closed position, the latch engages with a complementary portion of the latching assembly 192 to form a friction fit.

Figure 8A:
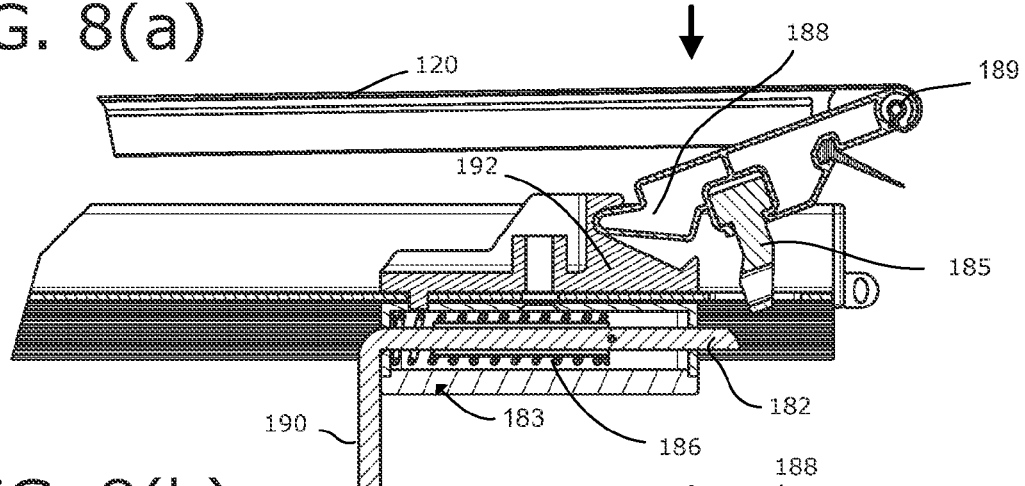
FIGS. 8(a) through 8(c) show cutaway views of the latching device in various stages of closure.
Figure 8B:
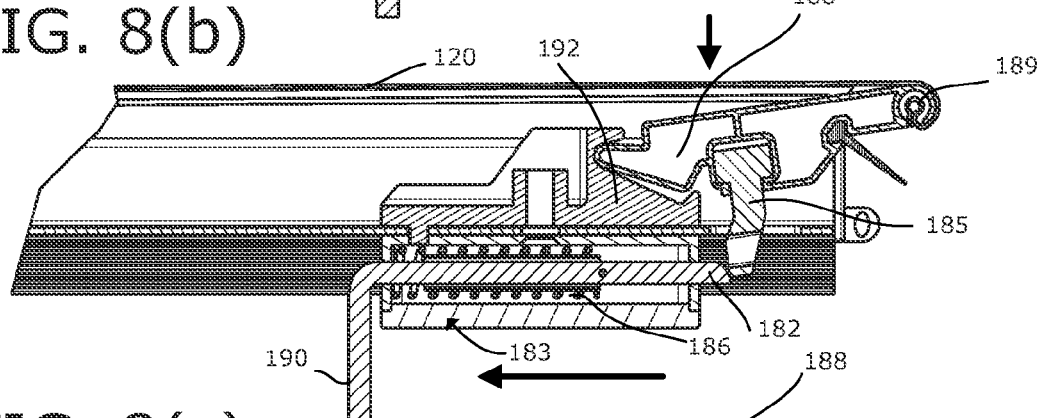
Figure 8C:
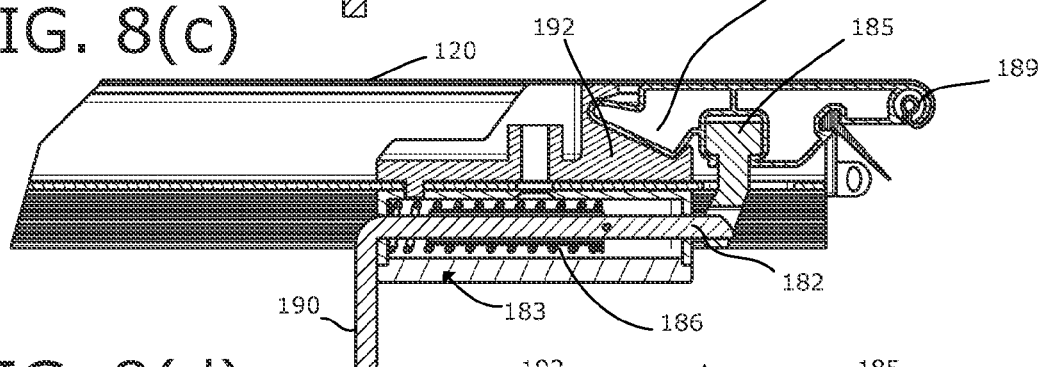
Figure 8D:
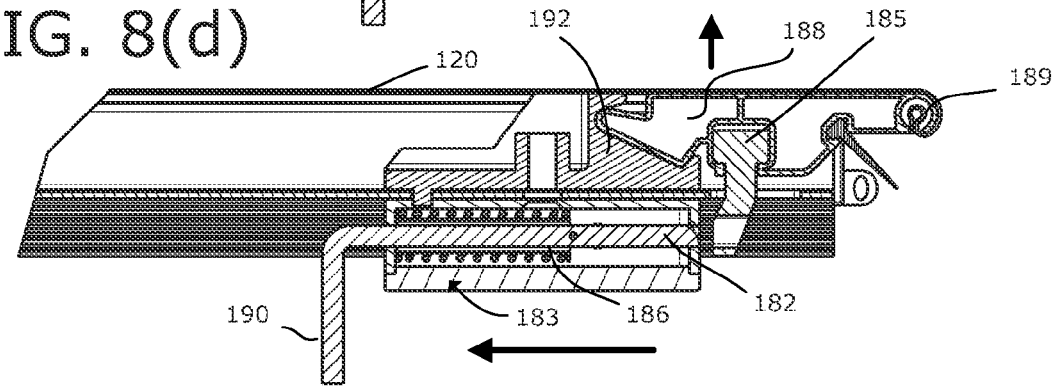
FIG. 8(d) shows a cutaway view of the exemplary latching device being opened by manual operation of a release lever.

FIGS. 8(a) through 8(c) show cutaway views of the latching device in various stages of closure. As shown, the latch 188 engages the complementary portion of the latching assembly 192, and, as the user applies downward pressure, the slotted extrusion 185 presses a curved portion of the spring loaded catch 182, pushing the catch slightly frontward and then allows the catch to move rearward and through the slotted extrusion 185, creating a secure fit. FIG. 8(d) shows a cutaway view of the exemplary latching device 180 being opened by manual operation of a release lever 190.

For simplicity of exposition, the present discussion does not include description of every feature that might be included in an actual commercial product, such as, for example, the use of weather stripping to seal the framing. Furthermore, it is to be understood that variations of the above-described features may be made. For example, additional clamping/bolting may be used to secure the framing. As another example, although four pin holes are shown, a fewer or greater number may be used in practice. Moreover, alternative fastening means (e.g., buttons, zippers) for securing the truck bed cover 120 to the vertical rails 103 may be also be used in place of, or in addition to, the hook-and-loop strips.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A tensioning device for a Tonneau cover, comprising:
   from a horizontal side rail, an edge of the cover attached thereto, a fastener;
   on an end of a vertical side rail, the vertical side rail attached substantially perpendicularly to the horizontal side rail, a plurality of pin holes and a larger, longitudinally elongated hole formed therein; and
   between the horizontal side rail and an end portion of the vertical side rail, a plate having a hole and a pin on a bottom surface thereof;
   wherein
      the fastener extends from the horizontal side rail, passing through the hole in the plate and the longitudinally elongated hole in the end portion of the vertical side rail, secured on an opposing side of the end portion of the vertical side rail; and
   wherein
      the pin is fitted into a selected one of the plurality of pin holes.

2. A system for securing a cover to an exterior compartment of a motor vehicle, the exterior compartment situate in the rear of the motor vehicle, comprising:
   a pair of vertical side rails, the first one of the pair of vertical side rails attached along a driver side of the exterior compartment and the second one of the pair of side rails attached along a passenger side of the exterior compartment;
   a pair of horizontal side rails, the first one of the pair of horizontal side rails attached along the front side of the exterior compartment and the second one of the pair of horizontal side rails attachable along the rear side of the exterior compartment;
   the cover, attached along opposite edges to each of the horizontal side rails and attachable along opposite side edges to the vertical side rails, capable of covering the exterior compartment substantially entirely when attached; and a pair of tensioning devices, each of the tensioning devices structured and arranged to pull the cover in a particular direction by a selected degree;

wherein the cover is attachable to each of the vertical side rails using a hook and fastening means.

3. The system of claim 2, wherein the cover can be pulled a distance toward the front of the exterior compartment by the pair of tensioning devices moving the first one of the pair of horizontal side rails toward the front of the exterior compartment.

4. The system of claim 2, wherein the cover is attachable along an edge of the second one of the pair of horizontal side rails using a latching mechanism.

5. The system of claim 4, wherein the latching mechanism allows the cover to be detached from the second one of the pair of horizontal side rails.

6. The system of claim 5, wherein the latching mechanism further includes a spring-loaded catch.

7. The system of claim 2, wherein each of the tensioning devices is situate in a respective corner formed between the first one of the pair of horizontal side rails and a respective one of the vertical side rails.

8. The system of claim 2, wherein each of the tensioning devices comprise:

from the first one of the pair of horizontal side rails, a fastener;

on an end of a respective one of the vertical side rails, the one of the vertical side rails attached substantially perpendicularly to the first one of the pair of the horizontal side rails, a plurality of pin holes and a larger, longitudinally elongated hole formed therein; and between the first one of the pair of horizontal side rails and an end portion of the one of the vertical side rails, a plate having a hole and a pin on a bottom surface thereof;

wherein the fastener extends from the first one of the pair of horizontal side rails, passing through the hole in the plate and the longitudinally elongated hole in the end portion of the one of the vertical side rails, secured on an opposing side of the end portion of the respective one of the vertical side rails; and wherein the pin is fitted into a selected one of the plurality of pin holes.

9. The system of claim 8, wherein the fastener is a bolt, the bolt secured on the opposing side with a nut.

10. The system of claim 2, wherein the cover is substantially rectangular.

11. The system of claim 10, wherein the cover is constructed of a substantially flat, flexible weather-resistant material.

12. The system of claim 2, wherein the cover is detachable from the vertical side rails.

13. A system for securing a cover to an exterior compartment of a motor vehicle, the exterior compartment situate in the rear of the motor vehicle, comprising:

a pair of vertical side rails, the first one of the pair of vertical side rails attached along a driver side of the exterior compartment and the second one of the pair of side rails attached along a passenger side of the exterior compartment;

a pair of horizontal side rails, the first one of the pair of horizontal side rails attached along the front side of the exterior compartment and the second one of the pair of horizontal side rails attachable along the rear side of the exterior compartment;

the cover, attached along opposite edges to each of the horizontal side rails and attachable along opposite side edges to the vertical side rails, capable of covering the exterior compartment substantially entirely when attached; and a pair of tensioning devices, each of the tensioning devices structured and arranged to pull the cover in a particular direction by a selected degree;

wherein the cover is attachable along an edge of the second one of the pair of horizontal side rails using a latching mechanism, the latching mechanism allowing the cover to be detached from the second one of the pair of horizontal side rails, the latching mechanism including a spring-loaded catch.

\* \* \* \* \*